(12) United States Patent
Janssens et al.

(10) Patent No.: US 12,129,349 B2
(45) Date of Patent: Oct. 29, 2024

(54) METHOD FOR PRODUCING EXPANDED THERMOPLASTIC POLYMERS WITH CONTROLLED DENSITY

(71) Applicant: Huntsman International LLC, The Woodlands, TX (US)

(72) Inventors: Bert Janssens, Hoboken (BE); Hugo Verbeke, Wilsele (BE)

(73) Assignee: HUNTSMAN INTERNATIONAL LLC

( * ) Notice: Subject to any disclaimer, the term of this patent is extended or adjusted under 35 U.S.C. 154(b) by 0 days.

(21) Appl. No.: 16/754,268

(22) PCT Filed: Oct. 31, 2018

(86) PCT No.: PCT/EP2018/079799
§ 371 (c)(1),
(2) Date: Apr. 7, 2020

(87) PCT Pub. No.: WO2019/086506
PCT Pub. Date: May 9, 2019

(65) Prior Publication Data
US 2021/0189086 A1 Jun. 24, 2021

(30) Foreign Application Priority Data
Oct. 31, 2017 (EP) .................................... 17199317

(51) Int. Cl.
*C08J 9/18* (2006.01)
*B29C 44/34* (2006.01)
*C08J 9/12* (2006.01)
*B29K 101/12* (2006.01)
*B29K 105/04* (2006.01)

(52) U.S. Cl.
CPC ............. *C08J 9/18* (2013.01); *B29C 44/3453* (2013.01); *C08J 9/122* (2013.01); *B29K 2101/12* (2013.01); *B29K 2105/04* (2013.01); *C08J 2201/032* (2013.01); *C08J 2203/06* (2013.01); *C08J 2203/08* (2013.01); *C08J 2203/182* (2013.01); *C08J 2300/22* (2013.01); *C08J 2300/26* (2013.01); *C08J 2375/06* (2013.01)

(58) Field of Classification Search
CPC ........ C08J 9/18; C08J 9/122; C08J 2201/032; C08J 2203/06; C08J 2203/08; C08J 2203/182; C08J 2300/02; C08J 2300/26; C08J 2375/06; C08J 2375/04; C08J 2207/00; B29C 44/3453; B29K 2101/12; B29K 2105/04
See application file for complete search history.

(56) References Cited

U.S. PATENT DOCUMENTS

2016/0297943 A1* 10/2016 Daschlein ................ C08J 9/236

FOREIGN PATENT DOCUMENTS

| CN | 101612772 | 12/2009 |
|---|---|---|
| CN | 104987525 | 10/2015 |
| WO | 2014150119 A1 | 9/2014 |
| WO | 2014150120 A1 | 9/2014 |
| WO | 2014150122 A2 | 9/2014 |
| WO | 2014150124 A1 | 9/2014 |
| WO | 2015052265 A1 | 4/2015 |

OTHER PUBLICATIONS

International Search Report received in corresponding PCT Application PCT/EP2018/079799, completed Nov. 23, 2018 and mailed on Dec. 3, 2018.
Written Opinion received in corresponding PCT Application PCT/EP2018/079799, completed Nov. 23, 2018 and mailed on Dec. 3, 2018.

* cited by examiner

*Primary Examiner* — K. Boyle
(74) *Attorney, Agent, or Firm* — HUNTSMAN INTERNATIONAL LLC; Lewis Craft

(57) ABSTRACT

A method for producing expanded thermoplastic polymeric (eTP) material and tuning the density of the eTP during the process of producing said eTP wherein the density of the eTP material can be decreased by increasing the partial pressure of the at least one gas which is soluble in the TP material and/or by increasing the total pressure during the charging step.

11 Claims, 3 Drawing Sheets

FIGURE 1 (PRIOR ART)
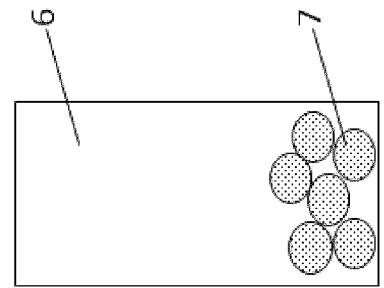
FIGURE 1A
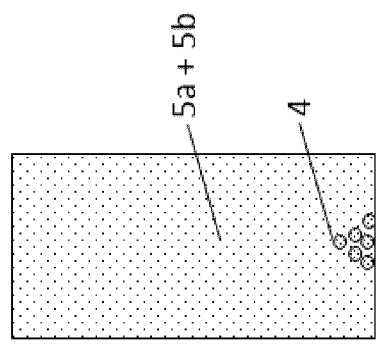
FIGURE 1B
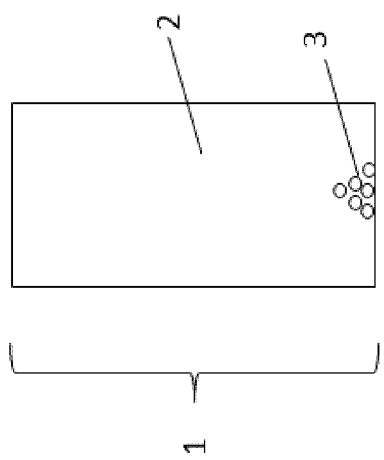
FIGURE 1C

METHOD FOR PRODUCING EXPANDED THERMOPLASTIC POLYMERS WITH CONTROLLED DENSITY

CROSS-REFERENCE TO RELATED APPLICATIONS

This application is the National Phase of International Application PCT/EP2018/079799 filed Oct. 31, 2018 which claims priority to EP Application Serial No. 17199317.3 filed Oct. 31, 2017. The noted applications are incorporated herein by reference.

FIELD OF INVENTION

The present invention relates to an improved and cost efficient method for making expanded (foamed) thermoplastic (eTP) polymers starting from non-expanded thermoplastic polymers (TP).

The invention further relates to a method for forming expanded thermoplastic polyurethane (eTPU) beads or sheets starting from non-expanded thermoplastic polyurethane (TPU) pellets having an average diameter in the range 0.2 mm up to 10 mm or from non-expanded thermoplastic polyurethane (TPU) sheets or parts.

The present invention further relates to eTP/eTPU and moulded products comprising said eTP/eTPU and use of said eTP/eTPU in for example footwear applications.

BACKGROUND OF THE INVENTION

Thermoplastic polyurethanes (TPU) are well-known, in particular, for their very high tensile and tear strength, high flexibility at low temperatures, extremely good abrasion and scratch resistance. TPU's are also known for their superior dynamic properties, in particular, very high rebound figures, low compression set and hysteresis loss. Expanded TPU (eTPU) not only preserves the excellent performance of its base material (non-expanded TPU) but on top of that also provide good shock-absorbing properties and therefore makes eTPU materials very attractive for use in highly demanding shock-absorbing materials such as the application in a shoe sole (especially in professional sport and running shoes).

To fabricate eTPU, more in particular eTPU beads, several foaming methods are known. Several foaming methods use an autoclave (1) wherein first the non-expanded TPU particles are introduced and put under high pressure using gaseous fluids (5) in order to saturate the TPU particles (3) and then there is a depressurizing step to expand the TPU particles (3) and obtain eTPU particles (7). These methods however use a constant pressure and vary the density by temperature, which makes the outcome in terms of density not very predictable. Examples using this method can be found in CN 1016122772, CN 104987525 and WO 2015052265 and is illustrated in FIG. 1A-1C.

WO 2015/052265 makes use of $N_2$ either by itself or in combination with $CO_2$ to expand the thermoplastic polymers (TP). The pressure during the saturation step is chosen high enough (>300 bar and higher) to make e.g. $N_2$ which has a low solubility in thermoplastic polymers (TP) soluble in the TP (as illustrated by example 1 in WO' 265).

There are several problems relating to density control in the state of the art foaming methods. There is hence a need to develop an improved foaming process in an autoclave making use of physical blowing agents which makes it possible to tune and/or control the density of the eTPU starting from non-expanded TPU, thereby avoiding above mentioned drawbacks and to obtain an improved low density eTPU.

AIM OF THE INVENTION

It is a goal of the invention to develop an improved process for fabricating expanded thermoplastic polymers (eTP), preferably expanded thermoplastic polyurethane (eTPU), starting from non-expanded TP or TPU whereby said process has improved foaming control and uses preferably environmentally friendly foaming gasses.

It is a goal of the invention to develop an improved process for fabricating expanded thermoplastic polymers (eTP), preferably eTPU starting from non-expanded TP or TPU thereby making it possible to tune the density of the eTP or eTPU during the processing.

It is a further goal to develop an improved process for fabricating expanded thermoplastic polymers (eTP), preferably eTPU starting from non-expanded TP or TPU thereby controlling the final density by controlling the partial pressure of the foaming gasses in the foaming process.

It is a further goal to develop an improved process for fabricating expanded thermoplastic polyurethanes suitable for use in vibration and shock absorptive materials such as the use in highly demanding footwear.

SUMMARY OF THE INVENTION

According to the invention, a method for producing expanded thermoplastic polymeric (eTP) material and reducing the density of the eTP during the process of producing said eTP is disclosed, said method comprising at least following steps:
Providing non-expanded thermoplastic polymeric (TP) material, and then
Placing the non-expanded TP material in an autoclave, and then
Increasing the temperature towards a temperature below the melting temperature of the TP material and increasing the total pressure in the autoclave to a value in the range 50-250 bar by introducing at least one soluble gaseous fluid which has a solubility of >10 mg gaseous fluid/g TP and at least one insoluble or low soluble gaseous fluid which has solubility <10 mg gaseous fluid/g TP (charging step), and then
Allowing the non-expanded TP material to reach a saturation state (saturation step), and then
Decreasing the total pressure in the autoclave to a value in the range 0-20 bar such that the TP material expands to form eTP material (expansion step)
Characterised in that during the charging step the partial pressure of the at least one soluble gaseous fluid is 10 up to 90% of the total pressure and the density of the eTP material is decreased by increasing the partial pressure of the soluble gaseous fluid and/or by increasing the total pressure during the charging step.

According to embodiments of the invention, the non-expanded TP material is in the form of pellets, sheets or any other shape.

According to embodiments of the invention, the TP material is selected from polystyrene (PS), Ethylene Vinyl Acetate (EVA), Poly Vinyl Chloride (PVC) Polymethylmetacrylate (PMMA), Acrylonitrilebutadiene styrene (ABS), thermoplastic polyurethane (TPU).

According to embodiments of the invention, the total pressure in the autoclave during the charging step is increased up to a value in the range 100-250 bar by introducing at least one gaseous fluid which is soluble in the TP material and at least one gaseous fluid which has a low solubility or which is insoluble in the TP material.

According to embodiments of the invention, the temperature within the autoclave is above the supercritical limits of the gaseous fluids and below the melting temperature of the TP material.

According to embodiments of the invention the gaseous fluid which is soluble in the TP material is selected from $CO_2$, $H_2S$, acetone, methyl ethyl ketone (MEK), propane, butane and/or pentane, or any combination of these with $CO_2$.

According to embodiments of the invention the gaseous fluid which has a low solubility or which is insoluble in the TP material is selected from $N_2$, $O_2$, H2, $CH_4$, He, Chloro Fluoro Carbons (CFC), Hydro Chloro Fluoro Carbons (HCFC), Hydro Chloro Fluoro Olefins (HCFO), Hydro Fluoro Olefins (HFO), (cyclo)-alkanes such as (cyclo)-pentane and/or noble gases such as krypton, xenon and argon, or any combination of these According to embodiments of the invention additional gasses having good thermal insulation properties such as Hydro Chloro Fluoro Carbons (HCFC), Chloro Fluoro Carbons (CFC), Hydro Chloro Fluoro Olefins (HCFO), Hydro Fluoro Olefins (HFO), (cyclo)-alkanes such as (cyclo)-pentane and noble gases such as krypton, xenon and argon may be added to the autoclave during the charging step.

According to embodiments of the invention the gaseous fluids in the autoclave may further comprise additives which are reactive towards the thermoplastic polymer (TP) and which result in modification of the TP during the charging step.

According to embodiments of the invention the TP material is thermoplastic polyurethane (TPU) and the temperature within the autoclave is within the range 30-250° C.

According to embodiments of the invention the TP material is TPU in the form of pellets having an average diameter from 0.2 to 10 mm, in particular from 0.5 to 5 mm.

According to embodiments of the invention during the charging step and saturation step the partial pressure of the soluble gaseous fluid is below 225 bar, preferably below 200 bar, more preferably below 150 bar, the total pressure in the autoclave is in the range 50-250 bar, preferably in the range 100-250 bar, more preferably in the range 100-200 bar and the temperature within the autoclave is within the range 30-250° C., preferably in the range 150-200° C.

According to embodiments of the invention during the charging step and saturation step the partial pressure of the soluble gaseous fluid is below 100 bar, preferably in the range 75-100 bar, more preferably in the range 80-100 bar, the total pressure in the autoclave is in the range 50-250 bar, preferably in the range 100-250 bar, more preferably in the range 100-200 bar and the temperature within the autoclave is within the range 30-250° C., preferably in the range 150-200° C.

According to embodiments of the invention the decrease in pressure during the expansion step is performed at a rate of several bars/second.

According to embodiments of the invention the step of allowing the TP material to reach a saturation state is performed at controlled pressure and temperature within the autoclave until blowing agent saturated TP material is achieved.

According to embodiments, the expanded TP material obtained according to the invention may be used in vibration absorptive materials, packaging materials, automotive interiors, sporting goods, footwear and heat insulating materials and furniture and appliances.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

Definitions and Terms

In the context of the present invention the following terms have the following meaning:
1) The term "pellet", as used herein, refers to a non-expanded piece of material (e.g. spherical, ellipsoidal, polyhedral or cylindrical) having an average diameter in the range 0.2 mm up to 10 mm, preferably in the range 0.5 up to 5 mm. The term "bead", as used herein, refers to an expanded or foamed pellet having dimensions being 1.2 up to 100 times the size of the original pellet.
2) The term "sheet", as used herein, refers to a non-expanded piece of material, with one dimension significantly smaller than the other two, typically but not exclusively a rectangular cuboid and wherein the smallest dimension falls in the range between 0.2 mm and to 100 mm. A further example could be a thin pre-shaped part like a shoe sole, or a thin polymer coating layer on a non expandable part. The term "expanded sheet", as used herein, refers to an expanded or foamed sheet having dimensions being 1.2 up to 100 times the size of the original sheet.
3) "Saturation" refers to the state where the required amount of blowing agent(s) has been dissolved into the Thermoplastic Polymer (TP) with only small internal concentration gradients remaining. The required dissolved amount largely depends on the final required density.
4) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.
5) The term "thermoplastic" as used herein refers in its broad sense to designate a material that is reprocessable at an elevated temperature, whereas "thermoset" designates a material that exhibits high temperature stability without such reprocessability at elevated temperatures.
6) The term "fluid uptake" or "gas uptake" as used herein refers to the amount of gaseous fluid (gas) that at a specific pressure and temperature is dissolved in the thermoplastic polymer (TP) and is typically expressed in mg gaseous fluid/g TP (mg gas/g TP).
7) The term "solubility" as used herein refers to the mass parts of TP required to dissolve 1 mass part of gaseous fluid (gas) under the given conditions of pressure and temperature.
8) As used herein a fluid (gas) is considered soluble in the thermoplastic polymer when under the given conditions of pressure and temperature, the solubility of the gaseous fluid (gas) in the thermoplastic polymer (TP) is >10 mg gaseous fluid/g TP or in other words 100 or less mass parts of TP are required to dissolve 1 mass part of the gaseous fluid (gas).

9) As used herein a fluid (gas) is considered insoluble in the thermoplastic polymer when under the given conditions of pressure and temperature the solubility of the gaseous fluid (gas) in the thermoplastic polymer (TP) is <0.0001 mg gaseous fluid/g TP or in other words >10000 mass parts of TP are required to dissolve 1 mass part of the gaseous fluid (gas).

10) As used herein a fluid (gas) is considered having a low solubility in the thermoplastic polymer when under the given conditions of pressure and temperature the solubility of the gaseous fluid (gas) in the thermoplastic polymer (TP) is in the range >0.0001 mg gaseous fluid/g TP up to <10 mg gaseous fluid/g TP or in other words >100 up to 10000 mass parts of TP are required to dissolve 1 mass part of the gaseous fluid (gas).

DETAILED DESCRIPTION

According to a first aspect of the invention, a process is disclosed for producing expanded thermoplastic polymeric (eTP) material and tuning the density of the eTP, said method comprising at least following steps:

Providing non-expanded TP material, and then

Placing the non-expanded TP material in an autoclave, and then

Increasing the temperature towards a temperature below the melting temperature of the TP material and increasing the total pressure in the autoclave to a value in the range 50-250 bar by introducing at least one soluble gaseous fluid which has a solubility of >10 mg gaseous fluid/g TP and at least one insoluble or low soluble gaseous fluid which has solubility <10 mg gaseous fluid/g TP (charging step), and then Allowing the non-expanded TP material to reach a saturation state (saturation step), and then Decreasing the total pressure in the autoclave to a value in the range 0-20 bar such that the TP material expands to form eTP material (expansion step)

Characterised in that during the charging step the partial pressure of the at least one soluble gaseous fluid is 10 up to 90% of the total pressure and the density of the eTP material is decreased by increasing the partial pressure of the soluble gaseous fluid and/or by increasing the total pressure in the autoclave during the charging step.

According to embodiments the at least one gaseous fluid which has a low solubility in the non-expanded TP has a solubility in the non-expanded TP in the range 0.0001 mg gaseous fluid/g TP up to 10 mg gaseous fluid/g TP.

According to embodiments the at least one gaseous fluid which is soluble in the non-expanded TP has a solubility of >10 mg gaseous fluid/g TP.

According to embodiments the at least one gaseous fluid which is insoluble in the non-expanded TP has a solubility of <0.0001 mg gaseous fluid/g TP.

Practically this means that a gaseous fluid (gas) is considered soluble when under the given conditions of pressure and temperature, it can reduce the density of the TP by a factor of 5 or more when used as the only fluid (gas) to reduce the density.

According to embodiments during the charging step the partial pressure of the at least one soluble gaseous fluid is preferably 10-60% of the total pressure, more preferably 20-50% of the total pressure, most preferably 20-40% of the total pressure in the autoclave.

It is an advantage of the process according to the invention that the process conditions can be set such that the insoluble fluid (gas) does not dissolve in the TP but only helps to create the right condition to improve and dissolve the soluble fluid (gas) in the TP. As a consequence, one can now predict how much fluid (gas) will be dissolved and since the amount of fluid (gas) dissolved in the TP determines the final density of the part, one can now also predict the final density of the TP after foaming by tuning the partial pressure of the at least one gas which is soluble in the TP material and/or by increasing the total pressure during the charging step.

According to embodiments during the charging step the partial pressure of the soluble gaseous fluid in the autoclave is increased up to 225 bar, preferably up to 200 bar, more preferably up to 150 bar, the total pressure in the autoclave is in the range 50-250 bar, preferably in the range 100-250 bar, more preferably in the range 100-200 bar and the temperature within the autoclave is within the range 30-250° C., preferably in the range 150-200° C.

According to embodiments during the charging step the partial pressure of the soluble gaseous fluid in the autoclave is increased up to 100 bar, preferably in the range 75-100 bar, more preferably in the range 80-100 bar, the total pressure in the autoclave is in the range 50-250 bar, preferably in the range 100-250 bar, more preferably in the range 100-200 bar and the temperature within the autoclave is within the range 30-250° C., preferably in the range 150-200° C.

According to embodiments the non-expanded TP material can be in any shape. Preferred examples are non-expanded TP materials in the form of pellets. Alternatively the non-expanded TP material is in the form of a sheet.

According to embodiments the total pressure in the autoclave is increased up to a value in the range 100-250 bar, preferably in the range 100-200 bar by introducing at least one gaseous fluid which is soluble in the TP material and at least one gaseous fluid which has a low solubility or which is insoluble in the TP material.

According to embodiments, the step of increasing the pressure in the autoclave (charging step) and introducing gaseous fluid(s) is performed at a temperature within the autoclave below the melting temperature of the TP material. In case the thermoplastic material is thermoplastic polyurethane, the temperature within the autoclave is preferably in the range 30-250° C., preferably in the range 50-200° C.

According to embodiments of the invention, the gaseous fluid which is soluble in the TP material is selected from $CO_2$. Alternatively the gaseous fluid which is soluble in the TP material is selected from $H_2S$, acetone, methyl ethyl ketone (MEK), propane, butane and/or pentane, preferably in combination with $CO_2$.

According to embodiments of the invention, the gaseous fluid which has a low solubility or which is insoluble in the TP material is selected from $N_2$. Alternatively the gaseous fluid which has a low solubility or which is insoluble in the TP material is selected from $O_2$, $H_2$, $CH_4$, He, Chloro Fluoro Carbons (CFC), Hydro Chloro Fluoro Carbons (HCFC), Hydro Chloro Fluoro Olefins (HCFO), Hydro Fluoro Olefins (HFO), (cyclo)-alkanes such as (cyclo)-pentane and/or noble gases such as krypton, xenon and argon preferably in combination with $N_2$. According to embodiments, additional gases having a lambda gas ≤12 mW/m·K such as Hydro Chloro Fluoro Carbons (HCFC's), Chloro Fluoro Carbons (CFC's), Hydro Chloro Fluoro Olefins (HCFO's), Hydro Fluoro Olefins (HFO's), (cyclo)-alkanes such as (cyclo)-pentane and noble gases such as krypton, xenon and argon are added to the autoclave.

Depending on the final application of the eTP material (e.g. beads) it may be desirable to additionally include gasses having good thermal insulation properties such as Hydro Chloro Fluoro Carbons (HCFC), Chloro Fluoro Carbons (CFC), Hydro Chloro Fluoro Olefins (HCFO), Hydro Fluoro Olefins (HFO), (cyclo)-alkanes such as (cyclo)-pentane and noble gases such as krypton, xenon and argon.

According to embodiments of the invention, the gaseous fluids in the autoclave may further comprise additives which may be reactive (not limited to covalent bonding) towards the thermoplastic polymer (TP) and which may result in modification of the thermoplastic polymer during the charging step. Typically these additives would aim to modify bulk properties, including for example colorants, fire retardants, anti-static agents, surfactants, peroxides . . . .

According to the invention, the thermoplastic polymeric (TP) material may be selected from polystyrene (PS), Ethylene Vinyl Acetate (EVA), Poly Vinyl Chloride (PVC) Polymethylmetacrylate (PMMA), Acrylonitrilebutadiene styrene (ABS), thermoplastic polyurethane (TPU).

According to the invention, the thermoplastic polymeric material is thermoplastic polyurethane (TPU), preferably but not limited in the form of pellets or sheets which may be fabricated using an extruder. In the extruder, the TPU starting material is first melted to form a TPU polymer melt and subsequently cooled and cut into the desired shape such as but not limited to pellets, sheets, or any other form.

According to embodiments of the invention, the TP material is in the form of TP pellets (e.g. TPU pellets) whose preferred average diameter is from 0.2 to 10 mm, in particular from 0.5 to 5 mm.

According to embodiments the decrease in pressure (expansion step) is performed at a rate of several bar/second.

According to the invention, the step of allowing the thermoplastic polymer material to reach a saturation state is performed at controlled pressure and temperature within the autoclave until blowing agent saturated thermoplastic polymeric material is achieved. This step typically can last from several minutes to several hours.

It is an aim of the invention to obtain expanded thermoplastic polymeric material (e.g. beads) with low density and wherein the density can be tuned by altering the partial pressure of the gaseous fluid which is soluble in the TP material and/or by increasing the total pressure during the charging step.

According to preferred embodiments, the TP polymer material is TPU polymer material. TPU and processes for their production are well known. By way of example, TPUs can be produced via reaction of (a) one or more polyfunctional isocyanates with (b) one or more compounds reactive toward isocyanates having a molecular weight in the range of from 500 to 500000 and, if appropriate, (c) chain extenders having a molecular weight in the range of from 50 to 499, and if appropriate in the presence of (d) catalysts and/or of (e) conventional auxiliaries and/or conventional additives.

The one or more polyfunctional isocyanates used for forming the TPU suitable for making the eTPU material (such as eTPU beads and eTPU sheets) used in the process according to the invention may be well-known aliphatic, cycloaliphatic, araliphatic, and/or aromatic isocyanates, preferably diisocyanates. For example tri-, tetra-, penta-, hexa-, hepta- and/or octamethylene diisocyanate, 2-methylpentamethylene 1,5-diisocyanate, 2-ethylbutylene 1,4-diisocyanate, 1,5-pentamethylene diisocyanate, 1,4-butylene diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, 2,2'-, 2,4'- and/or 4,4'-diphenylmethane diisocyanate (MDI), naphthylene 1,5-diisocyanate (NDI), 2,4- and/or 2,6-tolylene diisocyanate (TDI), diphenylmethane diisocyanate, 3,3'-dimethylbiphenyl diisocyanate, 1,2-diphenylethane diisocyanate, and/or phenylene diisocyanate.

The one or more polyfunctional isocyanates used for forming the TPU suitable for making the eTPU material (such as eTPU beads and eTPU sheets) used in the process according to the invention may consist essentially of pure 4,4'-diphenylmethane diisocyanate or mixtures of that diisocyanate with one or more other organic polyisocyanates, especially other diphenylmethane diisocyanates, for example the 2,4'-isomer optionally in conjunction with the 2,2'-isomer. The polyisocyanate component may also be an MDI variant derived from a polyisocyanate composition containing at least 95% by weight of 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols.

Preferred polyfunctional isocyanates are those containing at least 80% by weight of 4,4'-diphenylmethane diisocyanate. More preferably, the 4,4'-diphenylmethane diisocyanate content is at least 90, and most preferably at least 95% by weight.

The one or more compounds reactive toward isocyanates used for forming the TPU suitable for making the eTPU (such as eTPU beads and eTPU sheets) used in the process according to the invention may have a molecular weight of between 500 and 500000 and may be selected from polyesteramides, polythioethers, polycarbonates, polyacetals, polyolefins, polysiloxanes and, especially, polyesters and polyethers or mixtures thereof.

The one or more compounds reactive toward isocyanates used for forming the TPU suitable for making the eTPU (such as eTPU beads and eTPU sheets) used in the process according to the invention are preferably diols, such as polyether diols and may include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1, 5-pentanediol, 2-methyl-1,3-propanediol, 1,6-pentanediol and the like. Mixtures of initiators and/or cyclic oxides may be used.

The one or more compounds reactive toward isocyanates used for forming the TPU material suitable for making the eTPU (such as eTPU beads and eTPU sheets) used in the process according to the invention are preferably diols, such as polyester and may include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their esterforming derivatives, for example succinic, glutaric and adipic acids or their dimethyl esters, sebacic acid, phthalic anhydride, tetrachlorophthalic anhydride or dimethyl terephthalate or mixtures thereof. Polycaprolactones and unsaturated polyesterpolyols should also be considered.

Suitable low molecular weight (generally below 400) difunctional compounds that serve as chain extenders used for forming the TPU suitable for making the eTPU material (such as eTPU beads and eTPU sheets) used in the process according to the invention may include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methyl-pentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol, 1,4'-butyl enediol, 3-hydroxy-2,2-dimethyl-propanoic acid, aminoalcohols such as ethanolamine, N-methyldiethanolamine and the like, diamines, hydrazines and hydrazides and mixtures thereof. Preferred are diols such as hexanediol, 1,4-butanediol or ethylene glycol. 1,4-Butanediol is most preferred. Di-esters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights of from 162 to 378, are also suitable. Preferably the reaction mixture does not contain any low molecular weight triol.

Other conventional ingredients (additives and/or auxiliaries) may be used for forming the TPU material suitable for making the eTPU material (such as eTPU beads and eTPU sheets) used in the process according to the invention. These include catalysts, surfactants, flame proofing agents, fillers, pigments (to provide different colors), stabilizers and the like. Catalysts which enhance the formation of urethane and urea bonds may be used, for example, tin compounds, such as a tin salt of a carboxylic acid, e.g. dibutyltin dilaurate, stannous acetate and stannous octoate; amines, e.g. dimethylcyclohexylamine and triethylene diamine.

The reactants used for forming the TPU material suitable for making the eTPU material (such as eTPU beads and eTPU sheets) used in the process according to the invention may be applied using the so-called one-shot, solvent born, semi-prepolymer or prepolymer method known in the art by a batch or continuous process known to the person skilled in the art.

For example, one may use a prepolymer of polyisocyanate and polyol, then add the diol and the monool, or one may use a prepolymer of polyisocyanate and polyol and the monool, then add the diol in the process for forming the TPU suitable for making the eTPU particles used in the process according to the invention.

The eTP and more in particular eTPU (such as eTPU beads and eTPU sheets) according to the invention can be widely applied in the fields of vibration-absorptive materials, packaging materials, toys for children, sporting goods, aviation models, heat insulating materials, automotive interior materials and furniture and appliances.

FIGURES

FIG. 1 illustrates an autoclave set up and process steps to achieve expanded polymer particles according to the invention.

EXAMPLES

Figure 2:
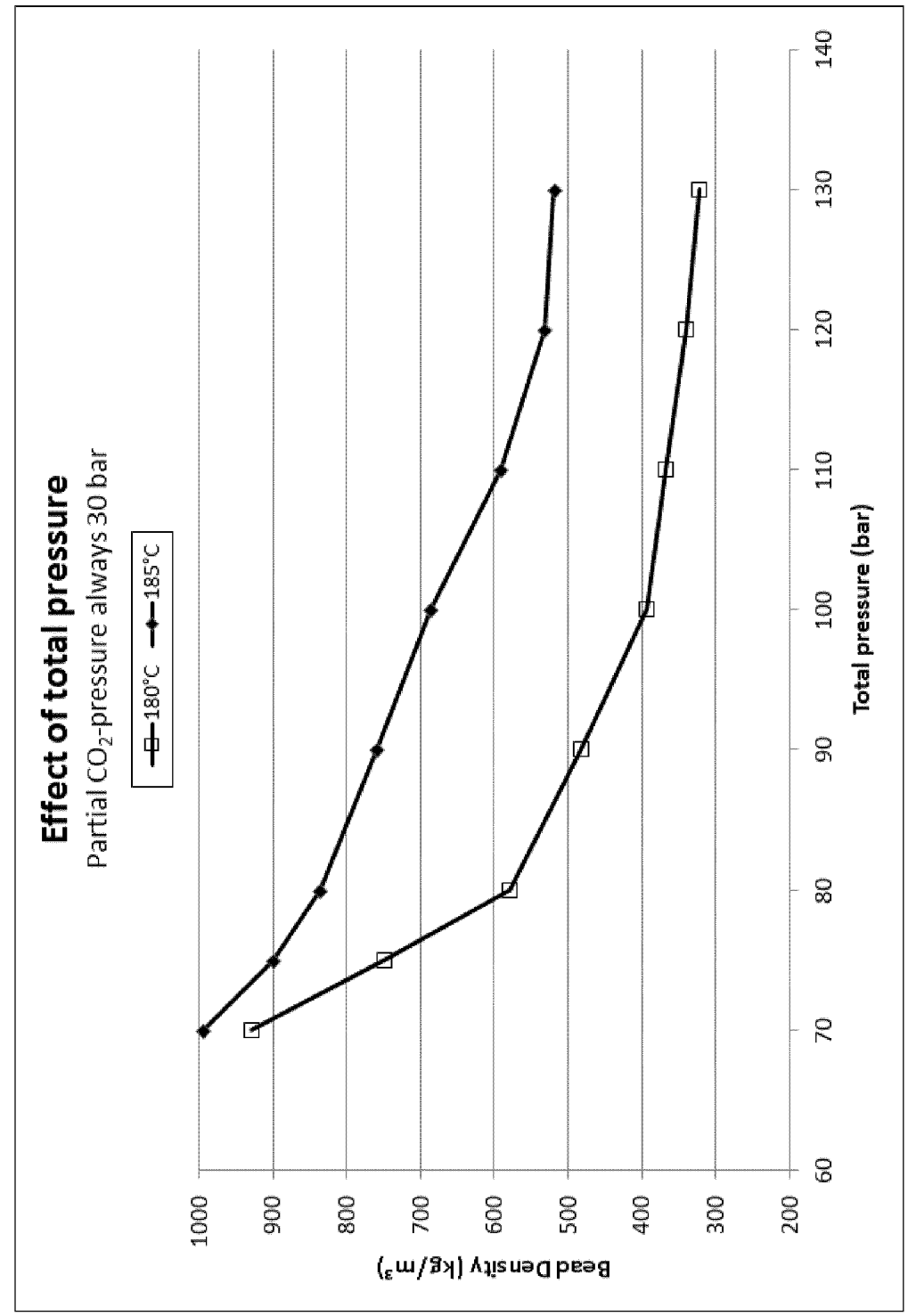
FIG. 2 illustrates the effect of altering the total pressure in the autoclave wherein the partial pressure of $CO_2$ is kept constant at 30 bar on the density of the achieved eTP material.

FIG. 1 illustrates an autoclave set up and process steps to achieve expanded polymer particles according to the invention.

The process steps to achieve expanded polymer particles according to an embodiment of the invention are summarized below:
  Heat-up the autoclave (1) till the required process-temperature. Autoclave (1): electrically heated tubular steel container, V=1.7 liter, 75 mm diameter, horizontally positioned.
  Position the TPU-material (3) in the centre of the autoclave.
  Close-off the autoclave.
  Pressurize with a (compressed) gaseous fluid which is soluble in the TP material (5a) and then close-off the supply.
  Increase internal pressure by means of compressed gaseous fluid which has a low solubility or which is not soluble in the TP material (5b) till the desired total pressure is reached.
  Maintain an iso-thermal & iso-bar state for short period (e.g. 5 minutes) to allow the TP material to absorb the gaseous fluid which is soluble in the TP material (to obtain saturated TP material (4) with gaseous fluid (5a).
  Induce a fast pressure-drop to ambient pressure (for example max. 2 seconds) to produce expanded TP material (7).
  Open the autoclave.
  Remove the (foamed) beads out of the autoclave.
  The resulting (foamed) eTPU material is left to stabilise under ambient temperature- & pressure-conditions prior to the density-measurement.

Example 1 Illustrating the Effect of Altering the Total Pressure

FIG. 2 illustrates the effect of altering the total pressure in the autoclave wherein the partial pressure of $CO_2$ is kept constant at 30 bar on the density of the achieved eTP material.

The process steps to achieve expanded polymer particles according to example 1 are as follows:
  Heat-up the pressure-vessel (1) till the required temperature (170-180-185° C.). Position 30 g Avalon A87P 6001 DP UV (dried) in the centre of the autoclave.
  Close-off the autoclave.
  Pressurize till 30 bar with (compressed) $CO_2$, followed by the close-off of the $CO_2$-supply.
  Increase internal pressure by means of compressed $N_2$ till the desired total pressure is reached (70-130 bar).
  Maintain an iso-thermal & iso-bar state for 5 minutes.
  Induce a fast pressure-drop to ambient pressure (max. 2 seconds).
  Open the autoclave.
  Remove the (blown) beads out of the autoclave.
  The resulting eTPU material (beads) are left to stabilise under ambient temperature-& pressure-conditions prior to the density-measurement.

An increase in total pressure from 70 bar towards 130 bar significantly reduces the density of the final eTPU bead. Apart from total (gas) pressure, final bead-density is also influenced by the temperature used during the pressurisation process. The usable temperature-range depends on the composition of the TP, and at all times needs to be lower than the melting temperature of the TP. Typically a higher process-temperature contributes to a lower bead-density, up to the point that the TP starts to melt and starts to lose its ability to retain the gas inside during the decrease in pressure (expansion-step).

Figure 3:
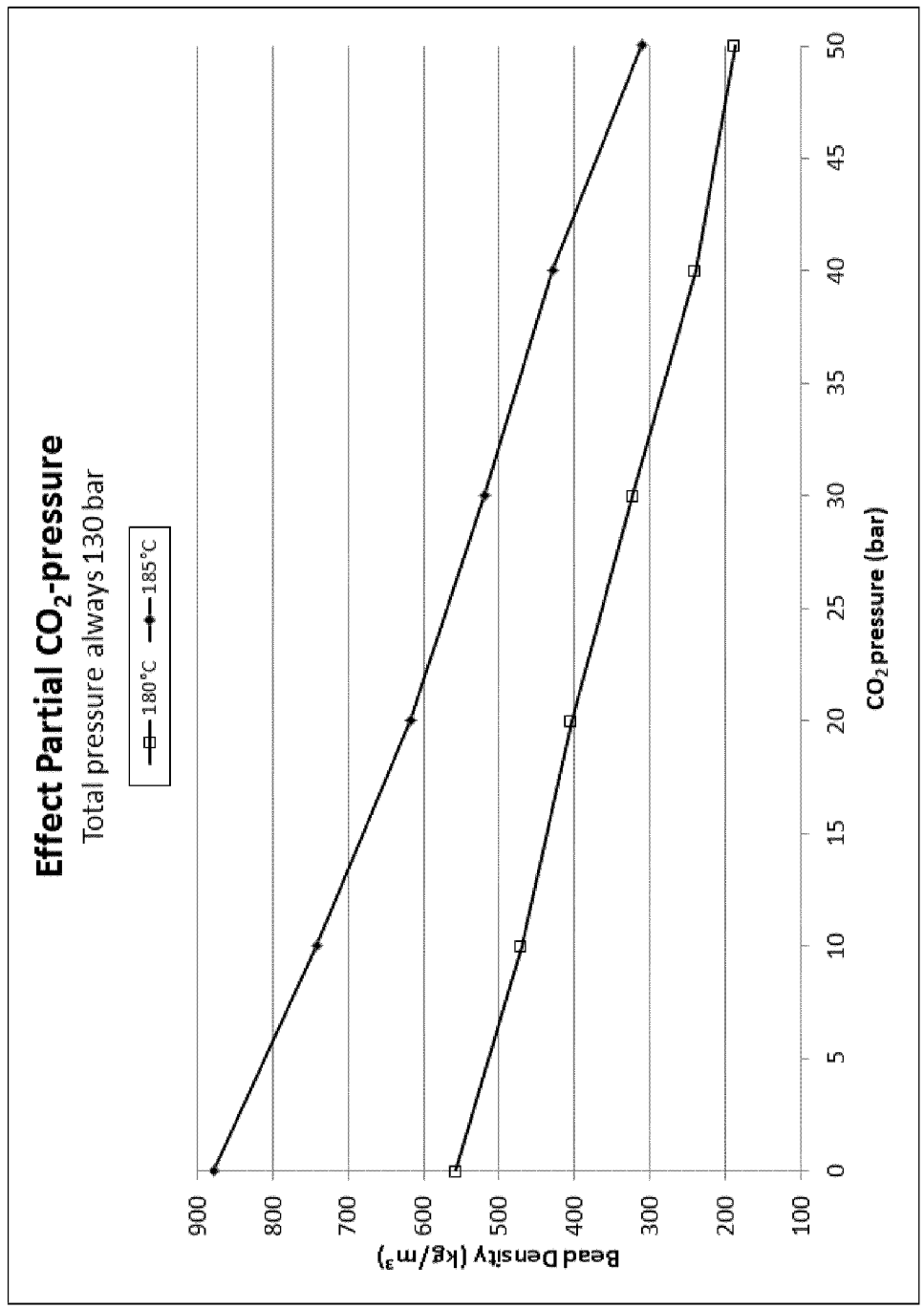
FIG. 3 illustrates the effect of altering the partial pressure of $CO_2$ in the autoclave wherein the total pressure is 130 bar on the density of the achieved eTP material.

Example 2 Illustrating Effect of Altering the Partial Pressure of $CO_2$ in the Autoclave FIG. 3 illustrates the effect of altering the partial pressure of $CO_2$ in the autoclave wherein the total pressure is 130 bar on the density of the achieved eTP material.

The process steps to achieve expanded polymer particles according to example 2 are as follows:

Heat-up the pressure-vessel till the required temperature (170-180-185° C.). Position 30 g Avalon A87P 6001 DP UV (dried) in the centre of the autoclave.

Close-off the autoclave.

Pressurize till the desired $CO_2$ partial pressure (0-50 bar) using (compressed) $CO_2$, followed by the close-off of the $CO_2$-supply.

Increase internal pressure by means of compressed $N_2$ till the total pressure of 130 bar is reached.

Maintain an iso-thermal & iso-bar state for 5 minutes.

Induce a fast pressure-drop to ambient pressure (max. 2 s).

Open the autoclave.

Remove the (blown) beads out of the autoclave.

The resulting eTPU material (beads) are left to stabilise under ambient temperature-& pressure-conditions prior to the density-measurement.

While keeping the combined pressures of soluble and insoluble fluids constant (at 130 bar), but altering the level (partial-pressure) of the soluble fluid, one can see that the final density of the eTPU (bead) decreases when the level of the soluble fluid increases. Since the changes of partial gas-pressure of the soluble fluid on density are much more linear (FIG. 3) than changes in the total pressure (while keeping the temperature constant), this is a more accurate way to control the final density of the eTP.

Controlling the density of the eTP by means of (partial) pressure-control is preferred over temperature-control, since it can be done more homogeneous & instantaneous.

The invention claimed is:

1. A method for producing expanded thermoplastic polyurethane ("eTPU") material from a non-expanded thermoplastic polyurethane ("TPU") material, said method comprising at least following steps:
   determining a final density for the eTPU material before expanding the TPU material;
   placing the TPU material in an autoclave and closing the autoclave;
   heating the autoclave to a temperature between 150°-185° C.;
   increasing internal pressure in the autoclave to a total pressure having a value in the range 50-250 bar by introducing at least one soluble gaseous fluid which has a solubility of >10 mg gaseous fluid/g TPU and at least one insoluble gaseous fluid which has solubility <0.0001 mg gaseous fluid/g TPU, wherein the at least one soluble gaseous fluid is introduced before introducing the at least one insoluble gaseous fluid ("charging step");
   allowing the non-expanded TPU material to reach a saturation state ("saturation step"), maintaining an iso-thermal and iso-bar state during the saturation step for only about 5 minutes;
   decreasing the total pressure in the autoclave to a value in the range 0-20 bar such that the TPU material expands to form the eTPU material ("expansion step") wherein during the charging step, the partial pressure of the at least one soluble gaseous fluid is in a range of 30 bar up to 100 bar and is 10 up to 90% of the total pressure, and wherein during the charging step, the partial pressure of the at least one soluble gaseous fluid and/or the total pressure are chosen based on the final density of the eTPU.

2. The method according to claim 1, wherein the non-expanded TPU material is in the form of pellets, sheets or any other shape.

3. The method according to claim 1, wherein the at least one soluble gaseous fluid is selected from $CO_2$, $H_2S$, acetone, methyl ethyl ketone (MEK), propane, butane and/or pentane, or any combination of these.

4. The method according to claim 1, wherein the at least one insoluble gaseous fluid is selected from $N_2$, $O_2$, $H_2$, $CH_4$, He, Chloro Fluoro Carbons (CFC), Hydro Chloro Fluoro Carbons (HCFC), Hydro Chloro Fluoro Olefins (HCFO), Hydro Fluoro Olefins (HFO), (cyclo)-alkanes or any combination of these.

5. The method according to claim 1, wherein an additional gas comprising a Hydro Chloro Fluoro Carbon, a Chloro Fluoro Carbon, a Hydro Chloro Fluoro Olefin, a Hydro Fluoro Olefin, a (cyclo)-alkane or a noble gas is introduced into the autoclave during the charging step.

6. The method according to claim 1, wherein the temperature within the autoclave is within the range 170°-180° C.

7. The method according to claim 1, wherein the TPU material is in the form of pellets having an average diameter from 0.2 to 10 mm.

8. The method according to claim 1, wherein the step of allowing the TPU material to reach a saturation state is performed at controlled pressure and temperature within the autoclave until blowing agent saturated TPU material is achieved.

9. The method according to claim 1, wherein during the charging step the partial pressure of the soluble gaseous fluid is increased to 100 bar and the total pressure in the autoclave is in the range of 100-200 bar.

10. The method according to claim 1, wherein during the charging step the partial pressure of the soluble gaseous fluid is increased to a range of 75-100 bar and the total pressure in the autoclave is in the range of 100-150 bar.

11. The method according to claim 1, wherein during the charging step the partial pressure of the soluble gaseous fluid is increased to a range of 0-100 bar and the total pressure in the autoclave is in the range of 100-200 bar.

* * * * *